United States Patent
Sakashita et al.

(10) Patent No.: US 6,630,069 B2
(45) Date of Patent: *Oct. 7, 2003

(54) HOLLOW FIBER MEMBRANE MODULE OF IMMERSING TYPE

(75) Inventors: Daichi Sakashita, Kanagawa-ken (JP); Chiaki Igarashi, Kanagawa-ken (JP); Shinsuke Shibuya, Tokyo (JP)

(73) Assignee: Ebara Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 43 days.

(21) Appl. No.: 08/997,057

(22) Filed: Dec. 23, 1997

(65) Prior Publication Data

US 2001/0009235 A1 Jul. 26, 2001

(30) Foreign Application Priority Data

Dec. 27, 1996 (JP) .............................................. 8-350924

(51) Int. Cl.[7] .............................................. B01D 63/00
(52) U.S. Cl. ............................ 210/321.69; 210/321.79; 210/321.8; 210/456; 210/636
(58) Field of Search ................................ 210/636, 456, 210/321.78, 321.79, 321.8, 321.81, 321.87, 321.88, 321.89, 321.9, 321.69, 323.2

(56) References Cited

U.S. PATENT DOCUMENTS

| | | | |
|---|---|---|---|
| 3,579,810 A | 5/1971 | Mon | |
| 4,231,878 A | * 11/1980 | Esmond | 210/321.81 |
| 5,209,852 A | * 5/1993 | Sunaoka et al. | 210/636 |
| 5,248,424 A | * 9/1993 | Cote et al. | 210/636 |
| 5,284,584 A | 2/1994 | Huang et al. | |
| 5,403,479 A | * 4/1995 | Smith et al. | 210/321.69 |
| 5,480,553 A | * 1/1996 | Yamamori et al. | 210/650 |
| 5,598,874 A | 2/1997 | Alei et al. | |
| 5,639,373 A | * 6/1997 | Mahendran et al. | 210/636 |
| 5,783,083 A | * 7/1998 | Henshaw et al. | 210/636 |

FOREIGN PATENT DOCUMENTS

| | | |
|---|---|---|
| EP | 598909 | 6/1994 |
| JP | 02-086818 | * 3/1990 |
| JP | 05123543 | 5/1993 |
| JP | 08257373 | 10/1996 |
| WO | 94/11094 | 5/1994 |
| WO | 97/18887 | 5/1997 |

* cited by examiner

*Primary Examiner*—Ana Fortuna
(74) *Attorney, Agent, or Firm*—Armstrong, Westerman & Hattori, LLP

(57) ABSTRACT

The present invention provides a hollow fiber membrane module of immersing type in which it is difficult for polluted substances to accumulate between hollow fiber membranes, and increase in pressure difference, reduction in flow rate and inter-fiber clogging can be prevented for a long time period. The module is provided at its both ends with water collecting portions having water collecting plates, and hollow fiber membranes are connected to the water collecting plates in such a manner that the hollow fiber membranes are not in contact with each other, and the hollow fiber membranes are mounted between the plates in a relaxed condition.

6 Claims, 6 Drawing Sheets

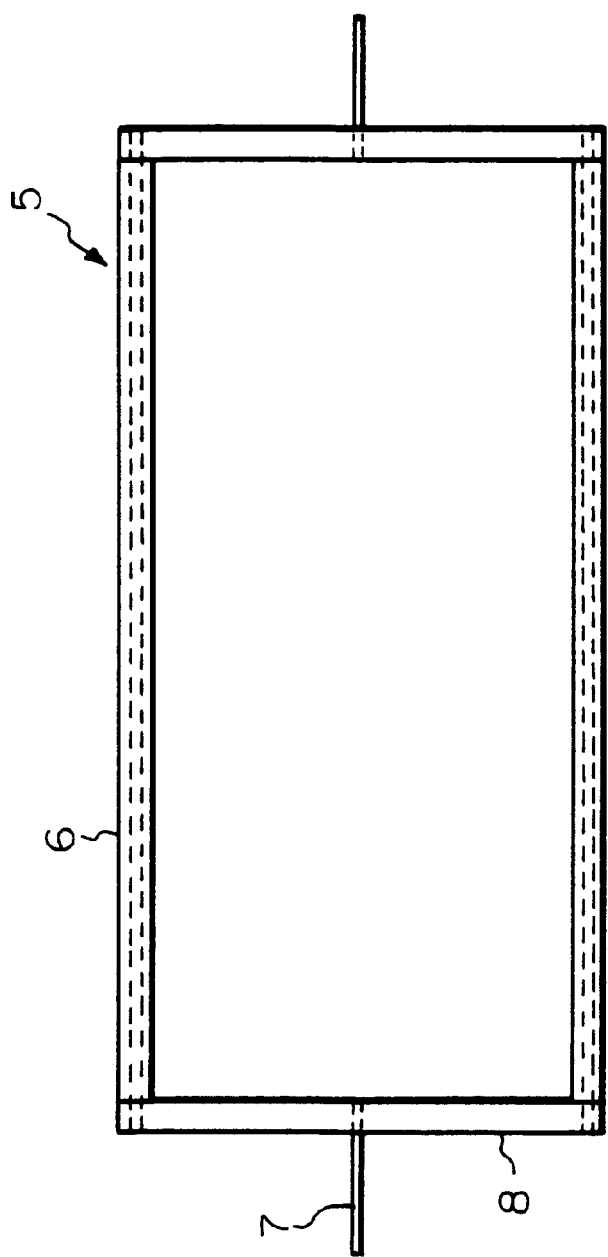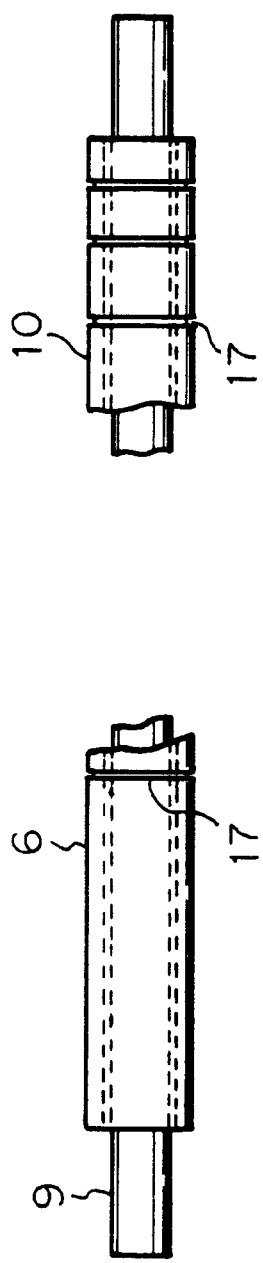
Fig. 2
Fig. 3

HOLLOW FIBER MEMBRANE MODULE OF IMMERSING TYPE

BACKGROUND OF THE INVENTION

1. Field of the Invention

The present invention relates to a separation membrane module having solid-liquid separating hollow fiber separation membranes used in the field of purification applications including the preparation of service water, drinking water, industrial water and pure water and polluted liquid treatment applications including removal of pollution from river water and sea water, treatment of waste water, night soil excrement and sewage water and condensation of slurry such as sludge, and a method for manufacturing such a separation membrane module.

Particularly, the present invention relates to a separation membrane module and a method for manufacturing such a separation membrane module, suitable for the treatment of a large amount of water.

Further, the present invention relates to water treating apparatus and method using such a separation membrane module.

2. Description of the Related Art

A hollow fiber separation membrane serves to cause liquid to flow through a tube wall having a great number of small holes to separate solid components or particles from the liquid. Material of the tube wall may be, for example, polyethylene, polypropylene, polysulfone, polyvinyl alcohol and their derivatives, 4-ethylene fluoride resin or cellulose acetate. An outer diameter of the hollow fiber separation membrane is 0.4 to 5 mm, for example, an inner diameter of the hollow fiber separation membrane is 0.3 to 4 mm, for example, and a diameter of each small hole is 0.01 to 5 $\mu$m, for example.

Since capacities required in a separation membrane module of a solid-liquid separation device are factors directly relating to water treatment amount and treatment efficiency such as wide separation area and good contact with fluid to be treated, for example, there have been investigated many hollow fiber membrane modules of a cylindrical type which comprises a bundle of hollow fibers arranged in a circle or concentric circles and has conventionally been used in the field of precision filtration applications. In this technique, the hollow fiber separation membranes are arranged in high density as much as possible and the number of hollow fibers are increased to obtain a condition that the hollow fibers are substantially in contact with each other, so that the surface area of the membranes is increased to increase the water treatment amount for each module.

However, if liquid to be treated having high density of suspended substance (for example, suspension in aeration tank used for sewage treatment process) is filtered by using such a hollow fiber separation membrane module, the suspended substance enters between the large number of hollow fiber separation membranes and is trapped therein. Consequently, the suspension cannot be supplied to the trapped zones, with the result that a plurality of hollow fiber separation membranes are apt to form stick-shaped bundles (such phenomenon is referred to as "inter-fiber clogging"). If such bundles are formed, since it is difficult for the liquid to be treated to enter into and be in contact with the interior of the bundle, the effective filtering area of the module is reduced, thereby worsening the filtering ability.

When such a hollow fiber separation membrane module (in which hollow fibers cohere (or stick) together into a mass) is periodically subjected to membrane surface cleaning or back washing, it is not easy to restore the function of the module whose hollow fibers once cohered together into a mass; in some cases, the hollow fiber separation membranes may also be damaged. This problem becomes noticeable particularly when highly polluted water or a large amount of water is treated.

In order to solve such a problem, modules having various configurations have been developed. For example, there has been proposed a water treating apparatus of immersing type in which a bundle of hollow fibers are arranged like a rattan blind in a flat plane to form a module and a plurality of modules are disposed side by side in a bath to form rough density sections, for example, refer to JP-A-5-220356 (Japanese Patent Laid-open), etc. However, also in such modules, since the arrangement of the bundle of the hollow fibers creates partial density sections and the hollow fibers are partially in contact with each other, the above problem cannot be solved completely.

The present invention aims to provide a hollow fiber separation membrane module and a method for manufacturing such a module, in which a polluted substance is hard to be deposited between hollow fiber separation membranes, and any increase in pressure difference, reduction of flow rate and inter-fiber clogging can be prevented for a long time.

Further, the present invention aims to provide a method for manufacturing a hollow fiber separation membrane module, in which, when the hollow fiber separation membrane module is manufactured, a great external force is not required, and the hollow fibers or bundles of hollow fibers can be interconnected in a spacial relation.

SUMMARY OF THE INVENTION

An object of the present invention is to provide a hollow fiber separation membrane module of immersing type having a plurality of hollow fiber separation membranes extending into liquid to be treated and a water collecting portion connected to ends of the hollow fiber separation membranes.

In the module according to the present invention, an inner cylindrical hollow portion of each hollow fiber separation membrane communicates with inner spaces of water collecting plates provided in the water collecting portions, and hollow fiber separation membrane strings comprised of one to seven hollow fiber separation membranes are spaced apart from each other so as not to be in contact with each other and are disposed in the water to be treated in a loosened condition.

Preferably, the module according to the present invention has the following arrangements. That is to say, (a) two water collecting portions are spaced apart from each other, and the hollow fiber separation membrane strings extend between the two water collecting portions and both ends of each hollow fiber separation membrane string are connected to the respective water collecting portions; (b) there is further provided a cleaning means a (FIG. 1 or 6) for removing substances accumulated on surfaces of the hollow fiber separation membrane strings from such surfaces; (c) the cleaning means includes a vibration means capable of vibrating the hollow fiber separation membrane strings; (d) the cleaning means has an air dispersing device having air dispersing plates disposed on the water collecting plates and adapted to supply bubbles into the liquid to be treated; (e) the cleaning means has a fluid pressure generating means so that pressurized fluid is discharged from discharge openings formed in the water collecting plates to flow the fluid toward the surfaces of the hollow fiber separation membrane; and (f) the water collecting plate has a plurality of water collecting openings, and the water collecting openings of one module can be connected to the water collecting openings of another module so that two or more modules are integrally connected to each other.

A concrete embodiment of the hollow fiber separation membrane module of immersing type is shown in FIG. 1, and supplementary explanation is made regarding the hollow fiber separation membrane module of immersing type according to the present invention. However, in FIG. 1, an example in which the hollow fiber separation membrane module of immersing type has a rectangular arrangement is illustrated, this example is merely used for explanation of the invention, and, thus, the present invention is not limited to such an example; however, a cylindrical arrangement as shown in FIG. 6 can be applied to the present invention. Therefore, the present invention does not limit the configuration of the module.

Incidentally, in the following explanation, the hollow fiber separation membrane or the bundle of the hollow fiber separation membranes are also referred to merely as "hollow fiber membrane", and the hollow fiber separation membrane module is also referred to merely as "hollow fiber membrane module". Further, the hollow fiber separation membrane strings are constituted by one or more hollow fiber separation membranes.

In the hollow fiber separation membrane module of immersing type shown in FIG. 1, the hollow fiber separation membranes (2) (or the bundle of the hollow fiber separation membranes) are disposed between water collecting plates (3) of plate-shaped water collecting portions arranged on both ends of a module (1) in a loosened condition. Each water collecting plate (3) of the plate-shaped water collecting portion is provided with a water collecting opening having a socket (4) to be connected to a similar water collecting plate of another hollow fiber separation membrane module.

In order to connect the hollow fiber membranes (2) to the water collecting plates (3) in a spaced (or non-contact) relation, a single hollow fiber membrane (2) or a bundle of plural (two to ten-odd; preferably, four or five) hollow fiber membranes (2) are spaced apart from each other (so as not to be in contact with each other) in a flow of liquid W to be treated shown by an arrow in FIG. 1 at connection points between the hollow fiber membranes (2) and the water collecting plates (3), and the hollow fiber membranes (2) are connected to the water collecting plates (3) so that the hollow fiber membranes are spaced apart from each other such that the hollow fiber membranes are not in contact with each other even when they are mounted in the loosened condition. A distance between the hollow fiber membranes (2) on each water collecting plate (3) is about 0.5 to 10 mm, for example, and, in case of the bundle of hollow fiber membranes (2), such a distance is preferably greater and may be about 3 to 10 mm. Further, in case of the bundle of hollow fiber membranes, spacers may be provided in the vicinity of the connection points of each water collecting plate (3) so that the hollow fibers constituting the bundle are spaced apart from each other.

In the conventional hollow fiber membrane modules of flat type such as rattan blind, since the bundles of hollow fiber membranes are disposed side by side and are partially in contact with each other, when the membrane surface washing is effected, the membranes are in contact with each other to generate the inter-fiber clogging, with the result that the surfaces of the hollow fiber membranes cannot be cleaned sufficiently, thereby worsening the filtering efficiency.

In order to mount the hollow fiber membranes (2) in the loosened or relaxed condition, when the hollow fiber membranes are wound around two parallel winding bars, a distance between the parallel winding bars is adjusted to be slightly greater than a distance which consists of a length of the membranes needed to be connected to the water collecting plate and a length between the left and right water collecting plates (3) provided on both ends of the membrane module (1). The extent of the loosened or relaxed condition in the hollow fiber membranes (2) may be such that the ratio (y/x) between a first length (x) of the hollow fiber membranes (2) in a tightly extended condition and a second length (y) of the hollow fiber membranes (2) to be added to the first length (x) so as to loosened the membranes is, for an example, 5%. In the present invention, the hollow fiber membranes (2) are to be loosened when they are immersed in a liquid. However, since the hollow fiber membranes (2) generally have tendency to increase their length by their use or being immersed in a liquid, they are not always necessary to be loosened during manufacturing but may be loosened by some way after being manufactured.

In the present invention, there may be provided a hollow fiber membrane module in which a water collecting plate of a water collecting portion is provided at one side of the membrane module and hollow fiber membranes are open to the water collecting plate, and the hollow fiber membranes are bent back at the other side, or a hollow fiber membrane module in which the other ends of the hollow fiber membranes are closed. However, it is desirable that water collecting plates of water collecting portions are provided on both ends of the membrane module.

The present invention also provides a method for manufacturing a hollow fiber separation membrane module. The method according to the present invention includes a first step of rotating two winding bars disposed in parallel with a predetermined distance around central axes of the winding bars to wind a plurality of hollow fiber separation membrane strings each comprised of one or more hollow fiber separation membranes around the winding bars such that they are not in contact with each other through a predetermined longitudinal width along the winding bars, a second step of rotating the two winding bars around which the plurality of hollow fiber separation membrane strings were wound along the longitudinal direction of the winding bars together with the hollow fiber separation membrane strings to form hollow fiber separation membrane elements, and a potting step of potting the hollow fiber separation membrane elements on water collecting plates.

Preferably, the manufacturing method according to the present invention has the following arrangement. That is to say, (g) each winding bar is constituted by a rigid core member telescopically inserted into a flexible hollow tube; (h) each winding bar is provided at its surface with a winding groove for the hollow fiber separation membrane strings; (i) each winding bar is formed from thermoplastic material having a melting point lower than that of the hollow fiber separation membrane string; (j) the first step includes a step of controlling a ratio between the rotational speeds of the winding bars and the speed for shifting the hollow fiber separation membrane strings along the longitudinal direction of the winding bars to a predetermined ratio; (k) the second step for forming the hollow fiber separation membrane elements includes a step of rotating the two winding bars with the provision of spacers at positions of the two winding bars; (l) the second step for forming the hollow fiber separation membrane elements includes a step of rotating the two winding bars to give desired configurations to the hollow fiber separation membrane elements by forming bent portions at predetermined corresponding positions on the two winding bars; (m) the second step for forming the hollow fiber separation membrane elements includes a step of reshaping the hollow fiber separation membrane elements to desired configurations; (n) the potting step includes a step of fixing one end of the hollow fiber separation membrane elements by immersing the one end into a potting agent, forming opening portions of the hollow fiber separation membranes by cutting the potting portions, and connecting the opening portions to the water collecting plates; (o) the potting step includes a step of inserting a core having recesses into which ends of the hollow fiber separation membrane elements can be entered within a mold for forming the water collecting plate, inserting the ends of the hollow fiber separation membrane elements into the recesses of the core, and, after the mold for forming the water collecting plate is filled with material of the water collecting plate and the material is solidified, removing the core to form a water collecting space, and cutting the ends of the hollow fiber separation membrane elements, and communicating the openings of the hollow fiber separation membranes with the water collecting space; (p) the second step for forming the hollow fiber separation membrane elements includes a step of withdrawing the rigid cores from the winding bars before the two winding bars are rotated; and (q) the second step for forming the hollow fiber separation membrane elements includes a step of rotating the winding bars while hollow fiber separation membrane fixing agent is being poured into the winding grooves or after the hollow fiber separation membrane fixing agent is poured into the winding grooves, when the two winding bars are rotated.

BRIEF DESCRIPTION OF THE DRAWINGS

FIG. 2 is a front view showing a frame around which the hollow fiber separation membranes of immersing type according to the present invention are wound;

FIG. 3 is a partial enlarged view of a hollow fiber membrane winding bar;

DETAILED DESCRIPTION OF PREFERRED EMBODIMENTS

Figure 1:
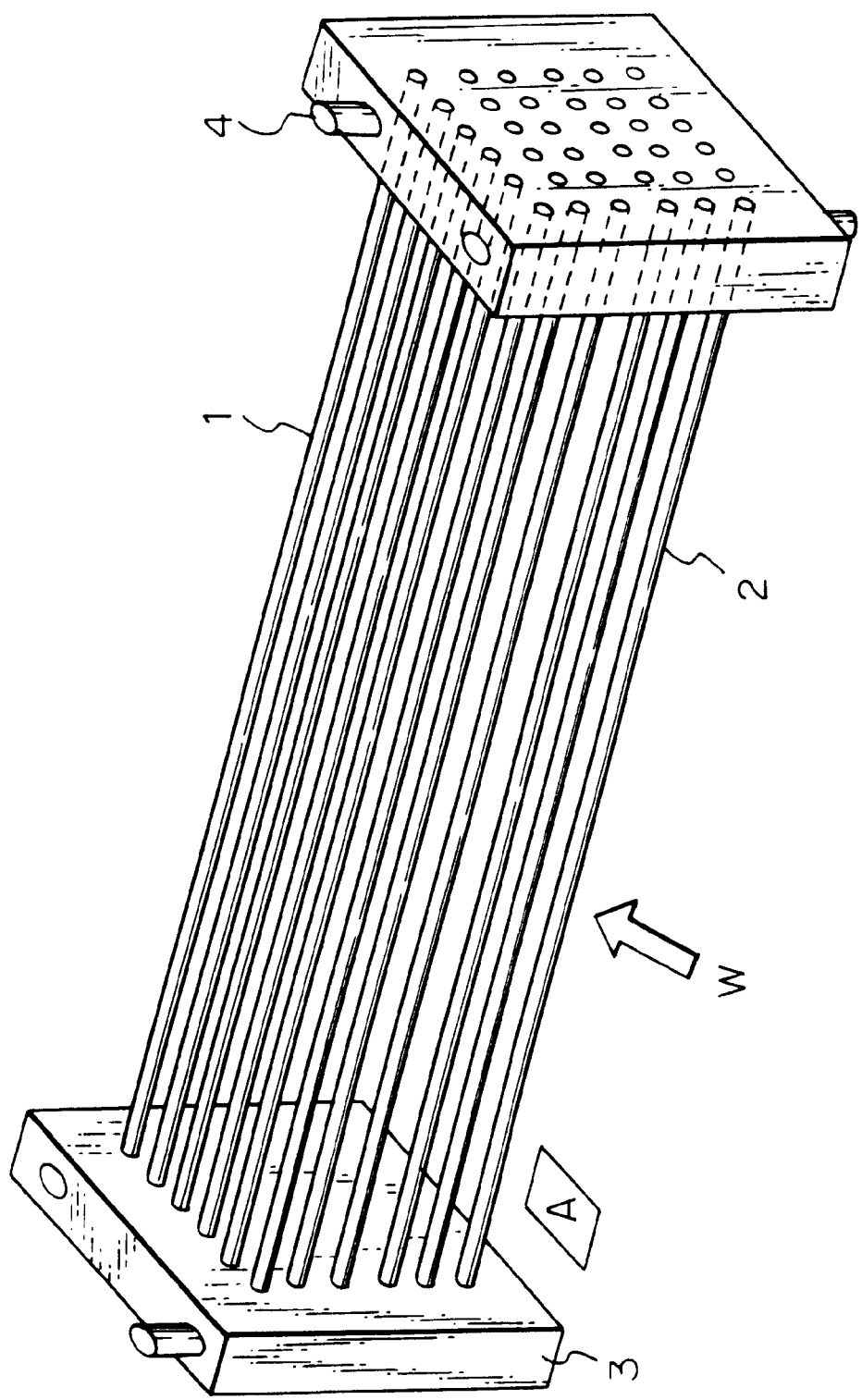
FIG. 1 is a perspective view of a hollow fiber separation membrane module of immersing type according to the present invention.

Prior to concrete supplementary explanation regarding a method for manufacturing a hollow fiber separation membrane module, in order to aid the understanding of the present invention, an embodiment of steps of manufacturing hollow fiber separation membrane elements (referred to as "hollow fiber separation membrane elements" hereinafter) is shown in FIGS. 2 to 5 and 7. However, the manufacturing steps shown in FIGS. 2 to 5 are only an embodiment and do not limit the manufacturing method of the present invention.

FIG. 2 is a front view showing a frame around which hollow fiber separation membranes 2 are wound. In FIG. 2, a winding frame 5 is constituted by hollow fiber membrane winding bars 6 and side frames 8 having central rotation shafts 7. A length (distance) between the side frames 8 is selected to become slightly greater than a distance between water collecting plates 3 of plate-shaped water collecting portions provided at both ends of a completed hollow fiber separation membrane module 1 (FIG. 1) so that the hollow fiber separation membranes 2 are mounted within the hollow fiber separation membrane module 1 in a loosened condition.

FIG. 3 is a partial enlarged view of the hollow fiber membrane winding bar 6. FIG. 3 shows a condition that a rigid core member 9 is inserted into the (hollow) hollow fiber membrane winding bar 6. Each hollow fiber membrane winding bar 6 is provided at its surface with a winding groove 10 to prevent winding deviation of the hollow fiber membrane 2 when the hollow fiber membrane 2 is wound around the hollow fiber membrane winding bar 6. For example, when it is desired that hollow fibers each having a diameter of 0.4 mm are arranged at a pitch of 4 mm, a diameter of each hollow fiber membrane winding bar 6 may be 4 mm, a width of the winding groove 10 on the bar may be greater than the diameter of the hollow fiber (for example, 1 mm, with play) and a distance between the grooves 10 may be 4 mm.

In addition, the hollow fiber membrane winding bar 6 is provided with bent portions 17 in order to wind a stock 15 of a hollow fiber membrane element (formed by winding the hollow fiber separation membranes 2 around the winding frame 5) to a desired configuration. The bent portions 17 are spaced apart from each other so that a distance between the adjacent bent portions is gradually increased from a center of the winding bar to both ends thereof. For example, when a cross-section of the wound stock is rectangular, three bent portions are provided at an equidistant relation and the bent portions 17 are wound while bending them at a right angle (90 degrees), and three bent portions 17 are provided at wider intervals. In this way, a rectangular shape having a gradually increasing diameter can be obtained. When two bent portions 17 spaced equidistantly are provided, a triangle shape is obtained, and, when five bent portions 17 spaced equidistantly are provided, hexagonal shape is obtained.

Figure 4:
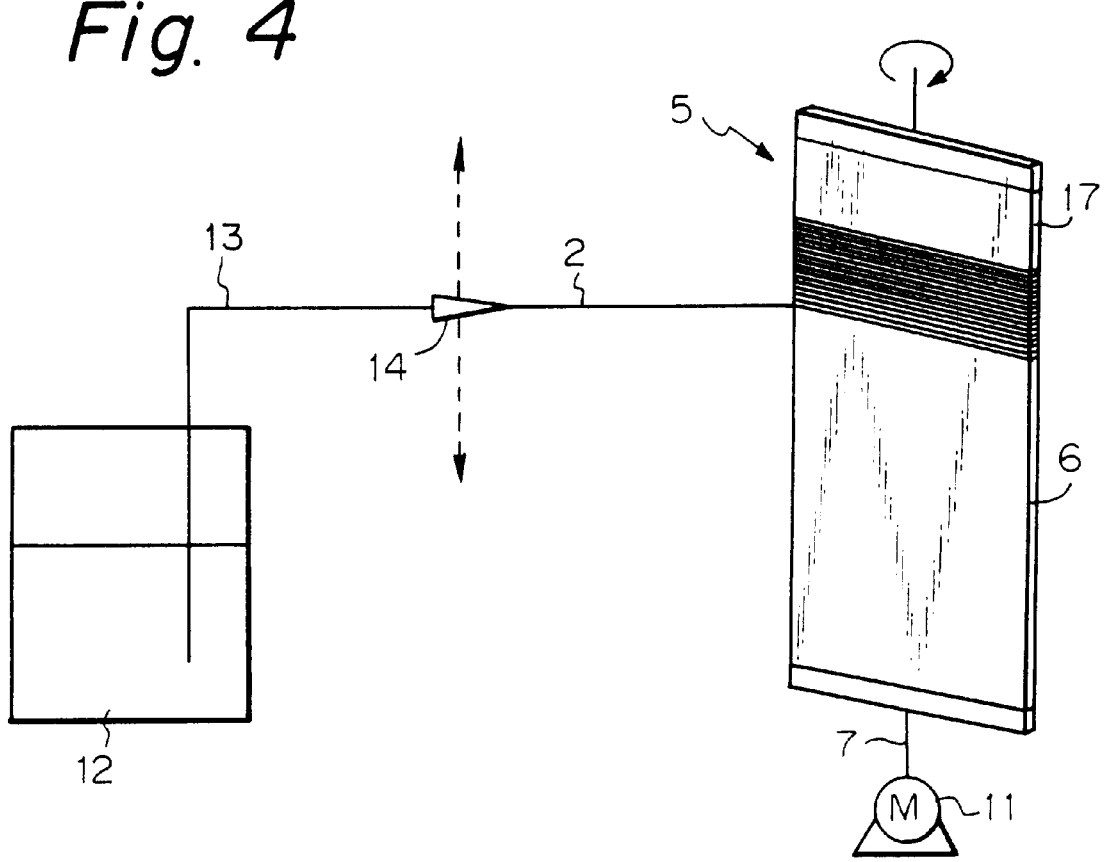
FIG. 4 is a constructural view showing a device for manufacturing a stock of a hollow fiber membrane element.

FIG. 4 shows a method for manufacturing a stock 15 of a hollow fiber membrane element, in which membrane manufacturing liquid 12 is sent from a tank containing the membrane manufacturing liquid 12 (as material for manufacturing the hollow fiber membrane 2) to a spinning nozzle 14 (for forming the hollow fiber membrane) through a liquid convey pipe 13, the hollow fiber membrane 2 is discharged from the spinning nozzle 14 which is being moved in a vertical direction, the spun hollow fiber membrane 2 is wound around the hollow fiber membrane winding bar 6 shown in FIG. 2, and the hollow fiber membrane 2 is wound at a predetermined pitch in a vertical direction (i.e., longitudinal direction of the hollow fiber membrane element) by rotating the winding frame 5 around a rotary shaft 7 by means of a motor 11 while shifting the spinning nozzle 14 in the vertical direction, thereby manufacturing the stock 15 of the hollow fiber membrane element.

Figure 5:
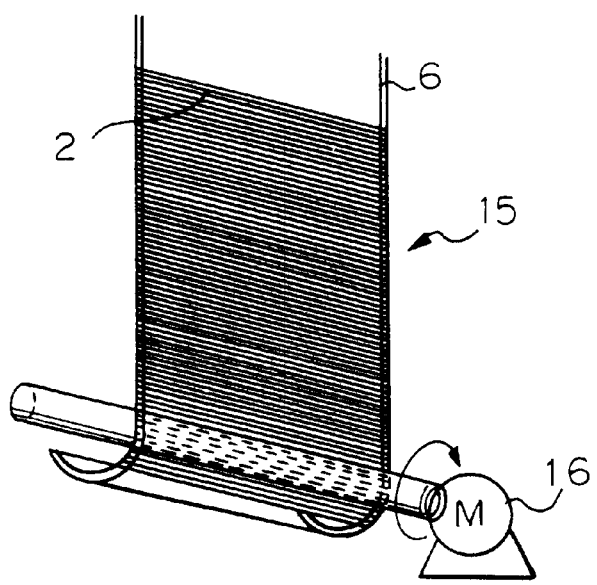
FIG. 5 is a perspective view of a device for manufacturing a hollow fiber membrane module by winding the hollow fiber membrane element according to the present invention.

FIG. 5 shows a step of winding, by means of a motor 16, along a longitudinal direction, an article obtained by removing the side frames 8 from the stock 15 of the hollow fiber membrane element formed by winding the hollow fiber membrane 2 around the winding frame 5 at the predetermined pitch (i.e., from the winding frame 5) and drawing the rigid core member 9 out of the hollow fiber membrane winding bar 6. In a preferred embodiment, when the article is wound, spacers are positioned a portion of the hollow fiber membrane winding bar 6.

In the present invention, it is desirable that the pair of left and right winding bars 6 of the winding frame 5 on which the hollow fiber membranes 2 are wound are formed from thermoplastic material having a lower melting point than that of the hollow fiber membrane 2. When the winding bar 6 is formed from the thermoplastic material having lower melting point than that of the hollow fiber membrane 2, after the stock 15 of the hollow fiber membrane element is wound in the second step (step shown in FIG. 5), since the hollow fiber membrane 2 can be fixed by heat treatment, the potting step can easily be performed. As such thermoplastic material, a conventional appropriate thermoplastic material can be used, although it depends on the material from which the hollow fiber membrane 2 is formed.

By controlling a ratio between the rotational speed of the winding bar 6 (FIG. 4) for the hollow fiber membrane 2 obtained by rotating the winding frame 5 around the rotary shaft 7 and the vertical shifting speed of the spinning nozzle 14 (i.e., shifting speed of the winding frame 5 for the hollow fiber membrane 2 in the longitudinal direction) to a predetermined value, the winding pitch of the hollow fiber membrane 2 and accordingly the disposition of the hollow fiber membrane 2 in the stock 15 of the hollow fiber membrane element and further accordingly the spaced condition of the hollow fiber membranes 2 open to the water collecting plates 3 of the water collecting portions of the hollow fiber membrane module 1 can be set freely. This operation can be effected mechanically and automatically without any manual operation. In this case, in the explanation regarding FIG. 4, where an example in which the relative shifting movement of the winding frame 5 for the hollow fiber membrane 2 in the vertical direction is effected by the vertical movement of the spinning nozzle 14 (i.e., longitudinal movement of a hollow fiber discharging device) was explained, the winding frame 5 may be shifted in the vertical direction while rotating the winding frame.

When the winding frame 5 is wound together with the hollow fiber membrane 2 in the longitudinal direction, by arranging the spacers at positions corresponding to the left and right winding bars 6, the disposition of the hollow fiber membranes 2 in the hollow fiber membrane module 1 can be set freely and the hollow fiber membranes 2 can be attached to the water collecting plates 3 easily and positively.

After the stock 15 of the hollow fiber membrane element is wound in the longitudinal direction, it is preferable that each winding bar 6 (for the hollow fiber membrane 2) is provided with bent portions 17 to permit the re-shaping of so formed hollow fiber membrane element to a desired shape, which bent portions 17 are spaced apart from each other so that a distance between the adjacent bent portions is gradually increased from a center of the winding bar to both ends thereof. In order to facilitate the provision of the bent portions 17 on the winding bar 6, it is desirable that cut-in portions are formed in the winding bar 6 to the extent that the winding bar is not damaged. When the bent portions 17 are not provided, upon attachment to the water collecting plates, any mold frame or guide means is required. However, when the bent portions are provided, such mold frame or guide means is not required.

Further, in the case where there is no bent portion 17, after the stock 15 of the hollow fiber membrane element is wound in the longitudinal direction, the cross-sectional shape may be forcibly re-shaped by using a re-shaping tool having a desired shape.

Figure 6:
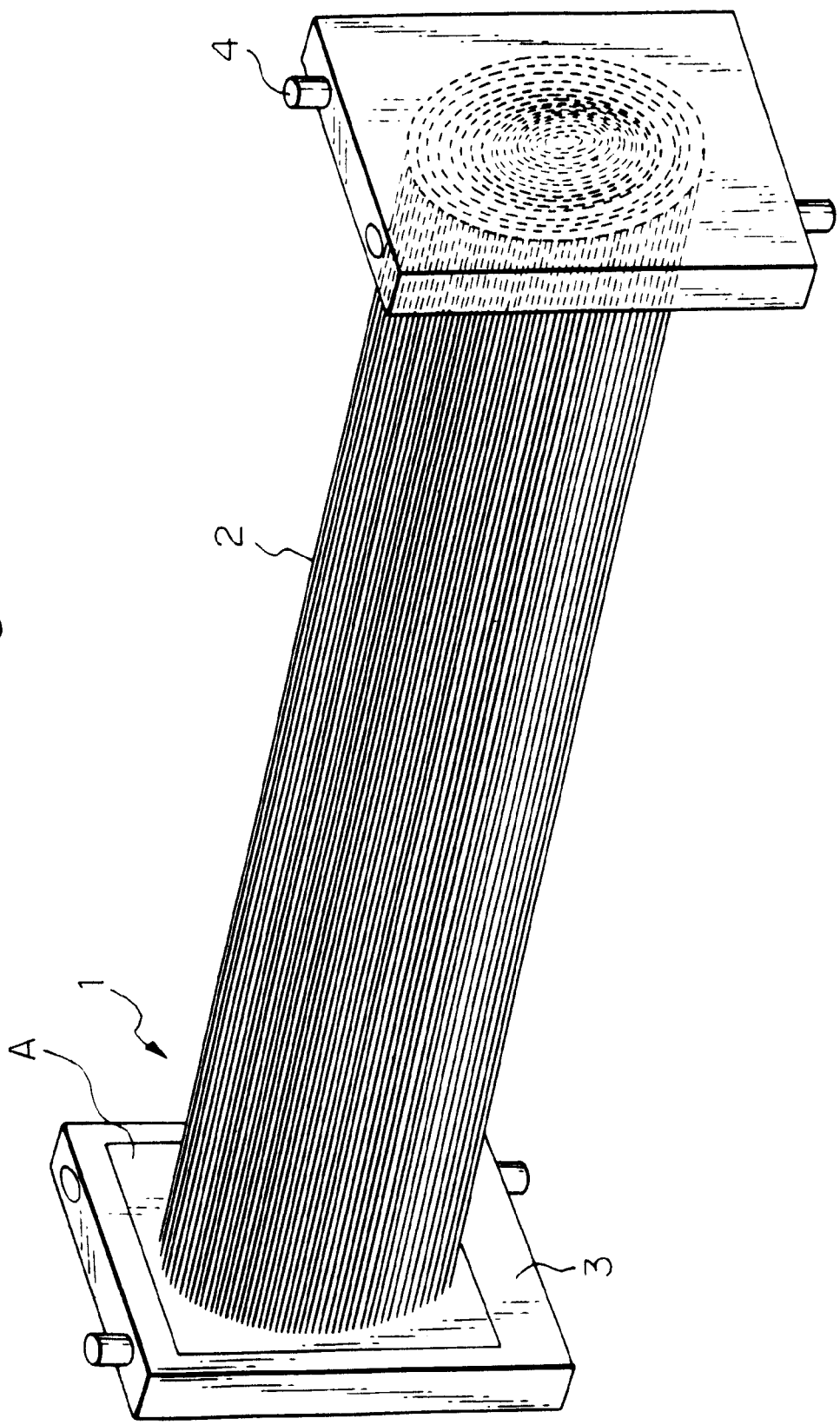
FIG. 6 is a perspective view showing a hollow fiber separation membrane module of immersing type according to another embodiment of the present invention.

If the stock of the hollow fiber membrane element is wound in a cylindrical shape without bent portions 17, a cylindrical hollow fiber module as shown in FIG. 6 can be obtained. However, when the hollow fiber winding bars are wound sharply (at an acute angle) by providing the bent portions 17, the arrangement of the hollow fibers can be made in a polygonal pattern as shown in FIG. 1. By adjusting the distance between the bent portions 17 and the bent angle of the bent portion, the polygonal pattern can be selected freely. The bent angle can easily be adjusted by cut-in configuration of the bent portion.

Further, when the winding bar 6 is wound while pouring hollow fiber fixing agent into a winding groove 10 (FIG. 3) formed in the winding bar 6 or after such hollow fiber fixing agent was poured into the winding groove 10, the stock 15 of the hollow fiber membrane element (refer to FIG. 5) can be attached to the water collecting plates easily and positively. At least one end of the hollow fiber membrane element so formed is fixed by immersing it into potting agent, and the hollow fiber membranes are opened by cutting, and the opened portions are closely connected to the water collecting plate of the water collecting portion.

Figure 7:
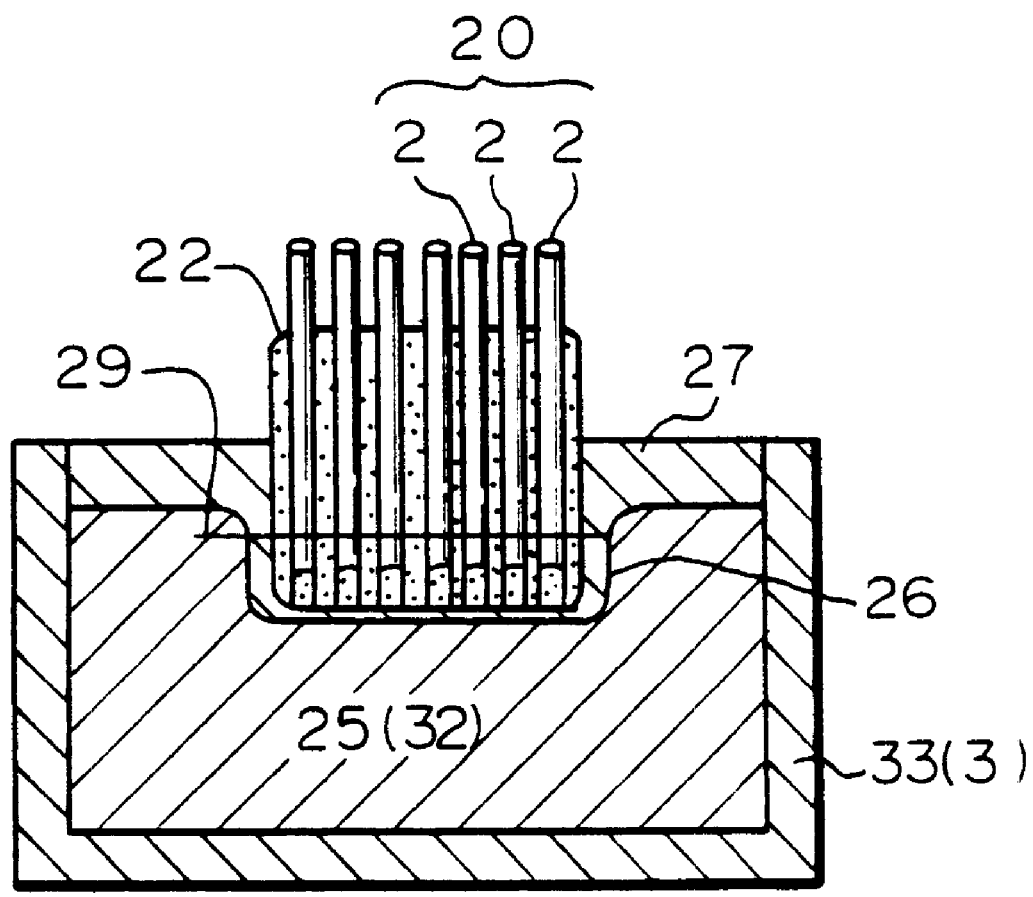
FIG. 7 is a schematic sectional view showing a potting step.

FIG. 7 is a schematic sectional view showing a potting step. In the potting step shown in FIG. 7, ends of a number of hollow fiber separation membranes 2 are fixed by the potting agent 22 to form a hollow fiber separation membrane string 20. A core 25 having a recess 26 is inserted into a mold 33 for the water collecting place 3, and the end of the hollow fiber separation membrane element is inserted into the recess of the core 25. The mold 33 for the water collecting plate is filled with material 27 for forming the water collecting plate, and after the material 27 is solidified, the core 25 is removed. The core 25 can be withdrawn in a direction perpendicular to the plane of FIG. 7. A space obtained after the core 25 is removed constitutes a water collecting space 32. Further, after the core 25 is removed, the end of the hollow fiber separation membrane string 20 is cut along a cutting line 29, and inner spaces of the hollow fiber separation membranes 2 which are not blocked by the potting agent communicate with the water collecting space 32. The opening portion of the water collecting plate through which a tool for withdrawing the core 25 and a tool for cutting the end of the hollow fiber separation membrane string 20 were inserted is then closed.

The core 25 may be provided with a hollow portion which constitutes the water collecting space 32 so that the removal of the core 25 is not required. In this case, the recess 26 of the core 25 is termed to protrude toward the hollow portion, and, by cutting the protruded portion and the end of the hollow fiber separation membrane string 20, the inner spaces of the hollow fiber separation membranes 2 which are not blocked by the potting agent are communicated with the water collecting space (hollow portion of the core).

An air dispersing plate a (FIG. 1 or 6) may be constituted by a conventional air dispersing tube or diffuser. When the bundle of the hollow fiber membranes is used in vertical disposition, the fluid generating means is preferably disposed on a lower water collecting plate from the view point of improvement of washing efficiency.

When a plurality of hollow fiber membrane modules are used, it is preferable that the water collecting openings of the water collecting plates of the water collecting portions of the respective modules can be interconnected. With this arrangement, the plurality of hollow fiber membrane modules can be arranged efficiently. As a result, a suction means such as a pressure reducing pump used as a power source for filtration can be made compact and simple. Further, it is desirable that a detachable socket member as shown in FIG. 1 is attached to the water collecting opening.

Regarding the water treating device using the hollow fiber membrane module according to the present invention, the hollow fiber membrane module may be arranged in a horizontal or vertical disposition. In the interconnection between the plurality of hollow fiber membrane modules, as mentioned above, by providing the detachable socket members (as shown in FIG. 1) on the water collecting openings of the water collecting plates, the hollow fiber membrane modules can be directly interconnected without using special pipings. By providing a partition plate having no separation membrane between the hollow fiber membrane modules, the distribution of the hollow fiber membranes can be adjusted. Such water treatment device may be operated while effecting the bubbling by adding a conventional air dispersing device.

Particularly when the hollow fiber membrane module is arranged in horizontal disposition, a plurality of bundles of the hollow fiber membranes may be used to prevent the damage due to vibration of the hollow fiber membranes in the vicinity of the attachment portions (to the water collecting plates) as the water treating device is operated while effecting the bubbling. Further, buffer members for dispersing forces acting on the hollow fiber membranes in the vicinity of the attachment portions (to the water collecting plates) may be provided.

The buffer member may be formed from, for example, a plastic net, a soft plastic sheet (made of polyvinyl chloride or polystyrene), soft rubber or adhesive.

In the operation of the water treatment device according to the present invention, the washing may be performed by periodically using conventional washing agent (which has conventionally been used for cleaning the smudged membranes) such as oxalic acid, hypochlorous acid or sodium hydroxide to remove fouling substance from the hollow fiber membranes. The washing agent may be supplied from a side of the water to be treated or from a water collecting side. In the washing operation, the smudged hollow fiber membrane module may be removed and immersed into a washing agent bath or the washing agent may be poured into the treatment bath directly.

Now, the hollow fiber membrane module according to the present invention will be fully described with reference to FIG. 1. However, the present invention is not limited to the embodiment illustrated in FIG. 1.

In FIG. 1, the hollow fiber membrane module 1 comprises the hollow fiber membrane element and the water collecting plates 3. Each water collecting plate 3 has a substantially square box shape having a substantially square hollow fiber membrane attaching surface and having a hollow portion. Two water collecting openings having connecting sockets 4 are formed in surfaces of the water collecting plate 3 other than the hollow fiber membrane attaching surface. A reinforcing post or porous wall is disposed in the water collecting chamber in the box-shaped water collecting plate. As the bundles of the hollow fiber membranes of the hollow fiber membrane element, the bundles comprised of two hollow fiber membranes are spaced apart from each other by a distance of 4 mm in vertical and horizontal directions.

When the hollow fiber membrane module is attached to the treatment bath having a dimension of 1.25×0.8 $m_2$, as it is assumed that a water collecting area substantially the same as that of the conventional module of rattan blind type is given, since a ratio of total cross-sectional area of the hollow fiber membranes with respect to the cross-sectional area of the water collecting plate is merely 5%, the hollow fiber membranes can be arranged roughly (with low density), with the result that the contact with the liquid to be treated and prevention of the inter-fiber clogging can be achieved very effectively.

Since the hollow fiber membrane module according to the present invention has two connection sockets and the hollow fiber membrane modules can be interconnected directly via the sockets, the space within the treatment bath can be utilized efficiently.

Further, since the hollow fiber membrane module according to the present invention can easily be manufactured substantially automatically by a series of steps with a desired shape, a large number of modules can be manufactured for a relatively short time. In the conventional hollow fiber membrane modules, since the potting operation and the disposition of the hollow fiber membrane bundles were effected manually, the productivity was worsened.

Although the hollow fiber membrane module according to the present invention can be arranged in horizontal disposition or in vertical disposition, particularly when the module is arranged in horizontal disposition, it is preferable that a plurality of bundles of the hollow fiber membranes is used to prevent the damage due to vibration of the hollow fiber membranes in the vicinity of the attachment portions (to the water collecting plates) as the water treating device is operated while effecting the bubbling, or the buffer members for dispersing forces acting on the hollow fiber membranes in the vicinity of the attachment portions (to the water collecting plates) are provided. The buffer member is preferably formed from a plastic net, a plastic sheet or rubber. When the module is arranged in vertical disposition, the damage of the hollow fiber membranes due to the vibration during the bubbling may not be taken into consideration. Accordingly, the hollow fiber membranes can be arranged one by one. In this case, the air dispersing device may be provided on the lower water collecting plate to effectively prevent the contamination of the hollow fiber membranes due to the bubbling.

In the operation of the water treating device according to the present invention, the washing may be performed by periodically using conventional washing agent (which has conventionally been used for cleaning the smudged membranes) such as oxalic acid, hypochlorous acid or sodium hydroxide to remove any fouling substance from the hollow fiber membranes. The washing agent may be supplied from a side of the water to be treated or from a water collecting side. In the washing operation, the smudged hollow fiber membrane module may be removed and dipped into a washing agent bath or the washing agent may be poured into the treatment bath directly.

Figure 8:
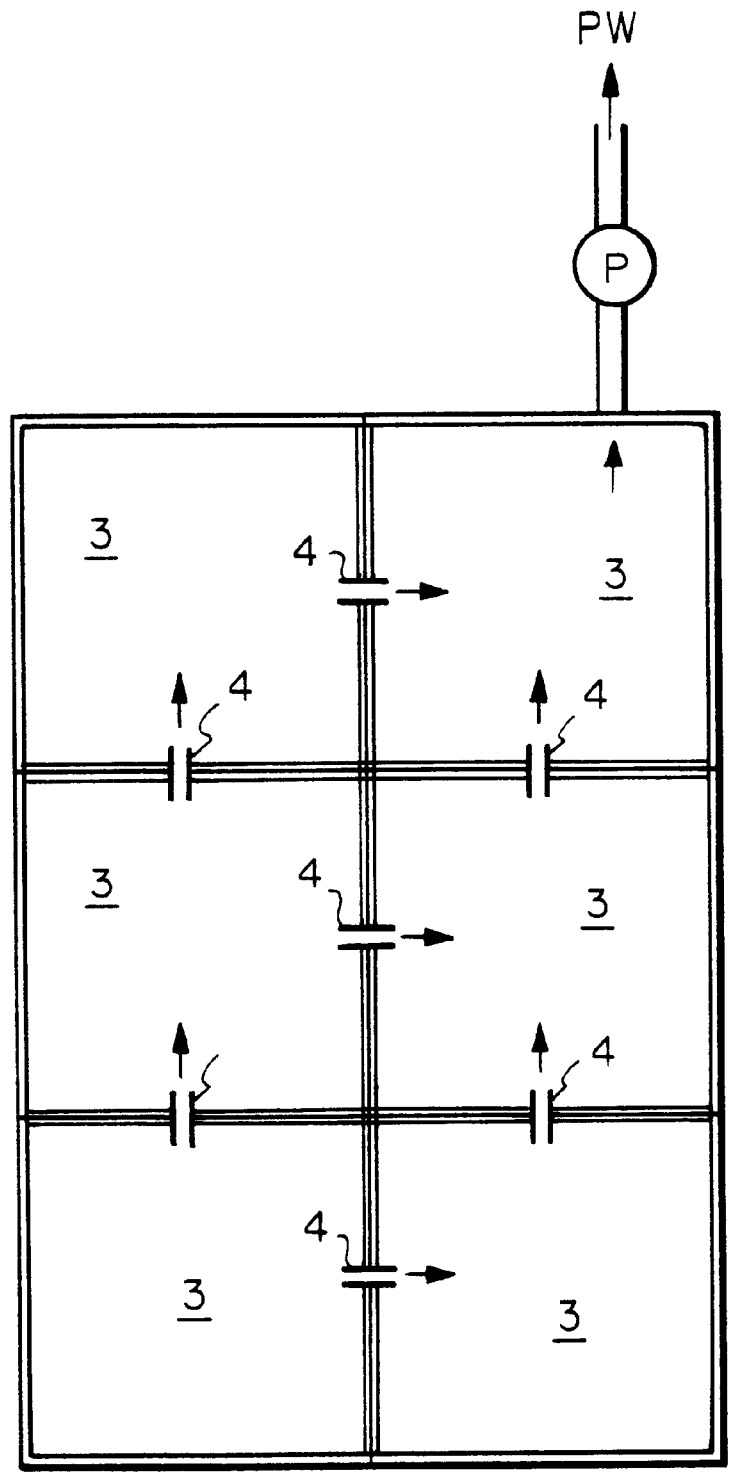
FIG. 8 is a schematic sectional view showing a connecting state of water collecting plates of a plurality of the modules.

FIG. 8 shows a schematic sectional view showing connected water collecting plates 3 of a plurality of the hollow fiber membrane modules in which each water collecting plate 3 has a plurality of sockets 4 provided with openings to pass the purified water PW as shown in arrows in FIG. 8. A pump P is connected one of the water collecting plate 3 in order to draw the purified water PW from the integrally connected hollow fiber membrane modules and to deliver it to a user side.

A plurality of the hollow fiber membrane modules each of which has only one socket may be connected to a manifold having a pump to draw the purified water from connected hollow fiber membrane modules to deliver it to a user side.

(Effects of the Invention)

As mentioned above, according to the present invention, since the hollow fiber separation membranes or the bundles of hollow fiber separation membranes constituting the hollow fiber separation membrane module are connected to the water collecting plates in a non-contact condition and are mounted in a relaxed condition, the following effects can be achieved.

(1) Membrane surfaces of the hollow fiber membranes can be used effectively.

(2) Reduction of membrane ability due to interfiber clogging can be suppressed.

(3) Contamination of the membranes due to the bubbling can be prevented.

(4) The smudged membranes can easily be cleaned by a washing agent and/or the bubbling.

(5) The space within the treatment bath can be utilized effectively.

Further, in the hollow fiber membrane module manufacturing method according to the present invention, since the hollow fiber membrane module can easily be manufactured substantially automatically by a series of steps with a desired shape, a large number of modules can be manufactured in a relatively short time.

Since the hollow fiber membrane module obtained by this method has a larger number of hollow fiber membranes than that in the conventional hollow fiber membrane modules of rattan blind type and is more compact than the conventional modules, the water treating device requires a smaller number of hollow fiber membrane modules of the present invention. Further, since the module has large water collecting portions, the water treating device can easily be constituted.

What is claimed is:

1. A hollow fiber separation membrane module of immersing type including a number of hollow fiber separation membranes extending into liquid to he treated, and two water collecting portions spaced apart from each other and connected to ends of said hollow fiber separation membrane, the module comprising:

a plurality of hollow fiber separation membrane strings extending between said two water collecting portions wherein ends of each of said hollow fiber separation membrane strings are connected to respective water collecting portion, and are spaced apart from each other so that said strings are not in contact with each other and are disposed in the water to be treated in a relaxed condition, said string consisting of two to seven hollow fiber separation membranes fixed at ends thereof within the string, and wherein an inner cylindrical hollow portion of each of said hollow fiber separation membranes communicates with an inner space of the water collecting plates provided in said water collecting portions, wherein each of said collecting plates has a plurality of water collecting openings, and water collecting openings of one module are adapted to be directly connected to the water collecting openings of another module so that two or more modules are integrally connected to each other.

2. A module according to claim 1, further comprising a cleaning means for removing substances accumulated on surfaces of said hollow fiber separation membrane strings from said surfaces.

3. A module according to claim 2, wherein said cleaning means includes a vibration means capable of vibrating said hollow fiber separation membrane strings.

4. A module according to claim 2, wherein said cleaning means includes an air dispersing device having an air dispersing plate disposed on said water collecting plate and adapted to supply bubbles into the liquid to be treated.

5. A module according to claim 2, wherein said cleaning means includes a fluid pressure generating means so that pressurized fluid is discharged from a discharge opening on said water collecting plate to flow the fluid toward the surfaces of said hollow fiber separation membranes.

6. A hollow fiber separation membrane module of immersing type including a hollow fiber separation membrane extending into liquid to be treated, and two water collecting portions spaced apart from each other and connected to ends of said hollow fiber separation membranes, the module comprising:

a plurality of hollow fiber separation membrane strings extending between said two water collecting portions, wherein said hollow fiber separation membrane string consisting of two to seven hollow fiber separation membranes fixed by a potting resin within a recess of the water collecting plate, and ends of each of said separation membrane strings are connected to the respective water collecting portions, and are spaced apart from each other so that said strings are not in contact with each other and are disposed in the water to be treated in a relaxed condition, wherein each of said water collecting plates has a plurality of water collecting openings, and the water collecting openings of one module are adapted to be directly connected to the collecting opening of another module so that two or more modules are integrally connected to each other, an inner cylindrical hollow portion of each of said hollow fiber separation membranes communicates with inner spaces of water collecting plates provided in said water collecting portions.

* * * * *